(12) United States Patent
Ikeda

(10) Patent No.: US 9,992,594 B2
(45) Date of Patent: Jun. 5, 2018

(54) EAR MODEL UNIT, ARTIFICIAL HEAD, AND MEASUREMENT DEVICE AND METHOD USING SAID EAR MODEL UNIT AND ARTIFICIAL HEAD

(71) Applicant: KYOCERA CORPORATION, Kyoto (JP)

(72) Inventor: Tomoyoshi Ikeda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days. days.

(21) Appl. No.: 15/661,379

(22) Filed: Jul. 27, 2017

(65) Prior Publication Data

US 2017/0325040 A1 Nov. 9, 2017

Related U.S. Application Data

(63) Continuation of application No. 14/646,363, filed as application No. PCT/JP2013/005800 on Sep. 30, 2013.

(30) Foreign Application Priority Data

Nov. 22, 2012 (JP) .................................. 2012-256654

(51) Int. Cl.
*H04R 29/00* (2006.01)
*H04R 5/027* (2006.01)
(Continued)

(52) U.S. Cl.
CPC .............. *H04R 29/001* (2013.01); *G01H 3/00* (2013.01); *G01H 17/00* (2013.01); *H04R 5/027* (2013.01);
(Continued)

(58) Field of Classification Search
CPC .......... G01H 11/00; G01H 3/00; G01H 17/00; G01H 11/08; H04R 5/027; H04R 25/00;
(Continued)

(56) References Cited

U.S. PATENT DOCUMENTS 4,741,035 A    4/1988  Genuit
4,924,502 A    5/1990  Allen et al.
(Continued)

FOREIGN PATENT DOCUMENTS

CN    1879393 A    12/2006
DE    19618019 A1    11/1997
(Continued)

OTHER PUBLICATIONS

International Search Report issued in PCT/JP2013/005800; dated Nov. 12, 2013.
(Continued)

*Primary Examiner* — Leshui Zhang
(74) *Attorney, Agent, or Firm* — Studebaker & Brackett PC

(57) ABSTRACT

A measurement device and measurement method for evaluating an acoustic device that allows a sound to be transmitted via vibration transmission by being held by a human ear includes an ear model unit having an ear model modeled after a human ear and an artificial external ear canal unit continuous with the ear model. The ear model unit is formed from rubber, a same material as an auricle model conforming to IEC 60318-7 or IEC 60268-7, or a material having a Shore hardness of from 30 to 60. The ear model is provided with an auricle or a hole which holds the acoustic device. A microphone is configured to measure an air-conducted component generated within an artificial ear canal of the artificial ear canal unit by vibration transmitted to the ear model unit from the acoustic device held by the auricle or the hole.

12 Claims, 7 Drawing Sheets

(51) Int. Cl.
  *H04R 25/00* (2006.01)
  *G01H 3/00* (2006.01)
  *G01H 17/00* (2006.01)
  *G01H 11/08* (2006.01)

(52) U.S. Cl.
  CPC ............ *H04R 25/30* (2013.01); *G01H 11/08* (2013.01); *H04R 2460/13* (2013.01)

(58) Field of Classification Search
  CPC ...... H04R 25/30; H04R 29/00; H04R 29/001; H04R 1/10; H04R 3/00; H04R 2460/13; H04R 25/70; H04R 2499/13; A61F 1/18; A61B 5/12; A61B 5/121
  USPC ... 381/58, 59, 60, 56, 55, 57, 70, 328, 71.1, 381/71.2, 71.6, 71.7, 72, 74, 75, 76, 77, 381/79, 332, 89, 111, 116, 117, 151, 337, 381/338, 339, 343, 345, 353, 162, 371, 381/373, 380, 382, 385, 329, 324, 322; 700/94; 600/25; 136/205
  See application file for complete search history.

(56) References Cited

U.S. PATENT DOCUMENTS

| | | | |
|---|---|---|---|
| 5,624,377 | A | 4/1997 | Davis |
| 7,881,483 | B2 | 2/2011 | Masuda et al. |
| 2006/0126855 | A1* | 6/2006 | Geiger ................... H04R 5/027 381/56 |
| 2007/0133442 | A1 | 6/2007 | Masuda et al. |
| 2011/0038487 | A1* | 2/2011 | Bai ....................... H04R 1/1016 381/58 |
| 2012/0088215 | A1* | 4/2012 | Bellezzo ................ G09B 23/36 434/270 |
| 2014/0093091 | A1 | 4/2014 | Dusan et al. |

FOREIGN PATENT DOCUMENTS

| | | |
|---|---|---|
| JP | S53-52101 A | 5/1978 |
| JP | S58-198338 A | 11/1983 |
| JP | H03-168000 A | 7/1991 |
| JP | H11-500284 A | 1/1999 |
| JP | 2002-315098 A | 10/2002 |
| JP | 2005-348193 A | 12/2005 |

OTHER PUBLICATIONS

Written Opinion of the International Searching Authority issued in PCT/JP2013/005800; dated Nov. 12, 2013; with concise explanation.

The extended European search report issued by the European Patent Office dated May 24, 2016, which corresponds to European Patent Application No. 13857191.4-1901 and is related to U.S. Appl. No. 14/646,363.

RU Office Action dated Sep. 9, 2016 which issued in related RU Appl No. 2015119247/28(029810) corresponding to parent PCT/JP2013/005800, 24 pp.

C-L Liao, "Application of cross-talk cancellation to the improvement of binaural directional properties for individuals using bone anchored hearing aids (BAHA)," Master's Thesis, Chalmers University of Technology, Department of Civil and Environmental Engineering, Divisional of Applied Acoustics, Sweden 2010, 7 pp.

E.H. Berger, "Preferred Methods for Measuring Hearing Protector Attenuation," Environmental Noise Control, The 2005 Congress and Exposition on Noise Control Engineering, Aug. 7-10, 2005, Rio de Janeiro, Brazil, 2 pp.

German Institute for Standardization (DIN), "Electroacoustics—Simulators of Human Head and Ear—Part 7: Head and Torso Simulator for the Measurement of Hearing Aids ," DIN IEC/TS 600318-7, Feb. 2012, 8 pp.

Office Action dated Jan. 10, 2017 which issued in related JP Appl No. 2014-548434, with concise statement of relevance; 5 pp.

CN Office Action dated Mar. 17, 2017 from corresponding CN Appl No. 201380060887.7, with English translation, 24 pp.

* cited by examiner

EAR MODEL UNIT, ARTIFICIAL HEAD, AND MEASUREMENT DEVICE AND METHOD USING SAID EAR MODEL UNIT AND ARTIFICIAL HEAD

CROSS-REFERENCE TO RELATED APPLICATION

This application is a Continuation application of U.S. patent application Ser. No. 14/646,363 filed May 20, 2015, which is the U.S National Phase Application of International Application No. PCT/JP2013/005800 filed Sep. 30, 2013, which claims priority to and the benefit of Japanese Patent Application No. 2012-256654 filed Nov. 22, 2012, the entire contents of which are incorporated herein by reference.

TECHNICAL FIELD

This disclosure relates to a measurement device and measurement method for evaluating an earphone or headphone-type acoustic device that allows sound to be heard via vibration transmission by placing a housing that includes a vibrating body within a human ear or pressing the housing against the ear. This disclosure also relates to an ear model unit and an artificial head used in the measurement device.

BACKGROUND

JP 2005-348193 A (PTL 1) recites an acoustic device, such as a mobile phone or the like, that transmits air-conducted sound and bone-conducted sound to a user. As the air-conducted sound, PTL 1 discloses a sound that is transmitted to the user's auditory nerve by air vibrations, caused by a vibrating object, that are transmitted through the external ear canal to the eardrum and cause the eardrum to vibrate. As the bone-conducted sound, PTL 1 discloses a sound that is transmitted to the user's auditory nerve through a portion of the user's body (such as the cartilage of the outer ear) that is contacting a vibrating object.

In the telephone disclosed in PTL 1, a rectangular vibrating body, formed from a piezoelectric bimorph and a flexible substance, is attached to an outer surface of a housing via an elastic member. PTL 1 also discloses that when voltage is applied to the piezoelectric bimorph in the vibrating body, the piezoelectric material expands and contracts in the longitudinal direction, causing the vibrating body to undergo bending vibration. Air-conducted sound and bone-conducted sound are transmitted to the user when the user touches the vibrating body to the auricle.

Apart from a telephone or the like that transmits sound by being held in the hand and pressed against the ear, examples of other devices that transmit sound based on such a transmission principle include cartilage transmission earphones and headphones that are used by being hooked and held somewhere on the human head.

CITATION LIST

Patent Literature

PTL 1: JP 2005-348193 A

In order to evaluate an acoustic device that is configured to transmit bone-conducted sound to the user via cartilage of the outer ear, such as cartilage transmission earphones or headphones that are used by being hooked and held somewhere on the human head, I recognized the necessity of measuring the amount of vibration that acts approximately on the human auditory nerve due to vibration of the vibrating body.

I therefore provide a measurement device, measurement method, and the like that can measure an amount of vibration weighted for characteristics of vibration transmission to a human ear and can evaluate an acoustic device such as earphones or headphones that include a vibrating body.

SUMMARY

I provide a measurement device for evaluating an acoustic device that allows sound to be transmitted via vibration transmission by being held by a human ear, the measurement device including: an ear model unit modeled after a human ear and a microphone that measures air-conducted sound generated in an artificial external ear canal unit continuous with the ear model.

The amount of vibration that takes into account the characteristics of vibration transmission to a human ear can thus be measured, and an earphone or headphone-type acoustic device, hearing aid, or the like that includes a vibrating body can be evaluated.

A measurement device for evaluating an acoustic device that allows a sound to be transmitted via vibration transmission by being held by a human ear includes an ear model unit having an ear model modeled after a human ear and an artificial external ear canal unit continuous with the ear model. The ear model unit is formed from rubber, a same material as an auricle model conforming to IEC 60318-7, a same material as an auricle model conforming to IEC 60268-7, or a material having a Shore hardness of from 30 to 60. The ear model is provided with an auricle or a hole which holds the acoustic device. The measurement device includes a microphone configured to measure an air-conducted component generated within an artificial ear canal of the artificial ear canal unit by vibration transmitted to the ear model unit from the acoustic device held by the auricle or the hole.

A measurement method for evaluating an acoustic device that allows a sound to be transmitted via vibration transmission by being held by a human ear includes an ear model unit having an ear model modeled after a human ear and an artificial external ear canal unit continuous with the ear model. The ear model unit is formed from rubber, a same material as an auricle model conforming to IEC 60318-7, a same material as an auricle model conforming to IEC 60268-7, or a material having a Shore hardness of from 30 to 60. The ear model is provided with an auricle or a hole which holds the acoustic device. The measurement device includes a microphone measuring an air-conducted component generated within an artificial ear canal of the artificial ear canal unit by vibration transmitted to the ear model unit from the acoustic device held by the auricle or the hole.

DETAILED DESCRIPTION

The following describes embodiments with reference to the drawings.

Embodiment 1

Figure 1:
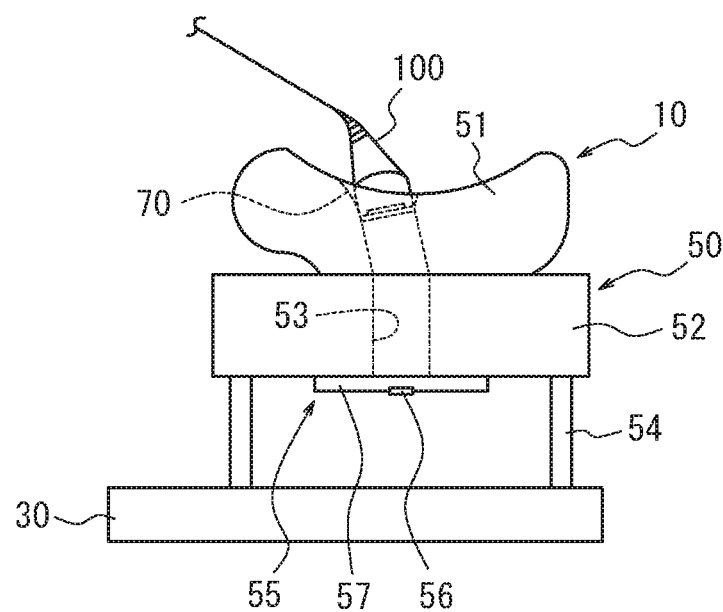
FIG. 1 schematically illustrates the structure of a measurement device according to Embodiment 1.
Figure 2:
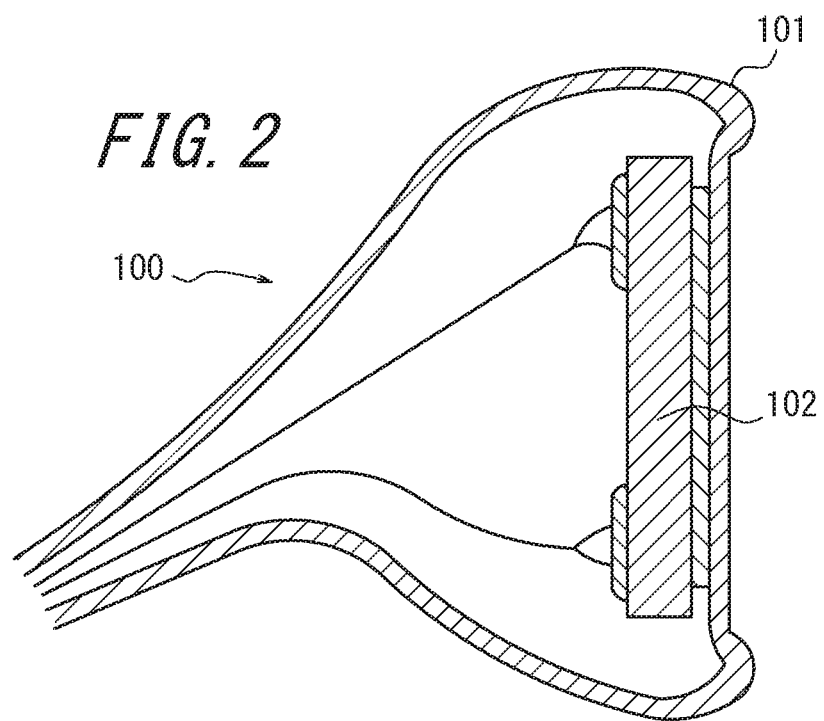
FIG. 2 is a cross-sectional diagram schematically illustrating an example of an earphone targeted for measurement.

FIG. 1 schematically illustrates the structure of a measurement device according to Embodiment 1. A measurement device 10 according to the present embodiment includes an ear model unit 50 supported on a base 30 and a model of the human body that includes a holder 70 holding an acoustic device 100. In the following explanation, a cartilage transmission earphone is illustrated as an example of the acoustic device 100. As illustrated in the cross-section of FIG. 2, the acoustic device 100 includes a housing 101 to be inserted in the hole of the human ear and a piezoelectric element 102 within the housing. The housing 101 is vibrated by the piezoelectric element 102.

First, the ear model unit 50 is described.

The ear model unit 50 is modeled after a human ear and includes an ear model 51, an artificial external ear canal unit 52 joined to or formed integrally with the ear model 51, and an artificial eardrum 57 joined to or formed integrally with the artificial external ear canal unit 52. The artificial external ear canal unit 52 is large enough to cover the ear model 51 and has an artificial external ear canal 53 formed in the central region thereof. The ear model unit 50 is supported on the base 30 via a support member 54 at the periphery of the artificial external ear canal unit 52.

The ear model 51 may include any of the helix, auricular tubercle, scaphoid fossa, antihelix, cymba conchae, cavum conchae, antitragus, earlobe, tragus, crus of helix, inferior antihelix crus, triangular fossa, superior antihelix crus, intertragic notch, and the like. The ear model 51 may thus have a variety of structures to allow for holding an acoustic device that is held in a variety of parts of the ear. For example, when the acoustic device is held by being supported between the inferior antihelix crus and the intertragic notch, the inferior antihelix crus and the intertragic notch are preferably provided. In other words, the holder is provided with the inferior antihelix crus and the intertragic notch. In the case of measuring an acoustic device provided with a main body and a vibrating portion, such that the main body includes an ear hook that hooks between the helix and the temporal region, and the vibrating portion vibrates due to an audio signal provided by the main body and is embedded in the cavum conchae, then the ear model 51 is provided with the helix and the temporal region, as well as the cavum conchae, as the holder. The ear model 51 may include any of the helix, auricular tubercle, scaphoid fossa, antihelix, cymba conchae, cavum conchae, antitragus, earlobe, tragus, crus of helix, inferior antihelix crus, triangular fossa, superior antihelix crus, intertragic notch, and the like. The ear model 51 may thus have a variety of structures to allow for holding an acoustic device that is held in a variety of parts of the ear. For example, when the acoustic device is held by being supported between the inferior antihelix crus and the intertragic notch, the inferior antihelix crus and the intertragic notch are preferably provided. In other words, the holder is provided with the inferior antihelix crus and the intertragic notch. In the case of measuring an acoustic device provided with a main body and a vibrating portion, such that the main body includes an ear hook that hooks between the helix and the temporal region, and the vibrating portion vibrates due to an audio signal provided by the main body and is embedded in the cavum conchae, then the ear model 51 is provided with the helix and the temporal region, as well as the cavum conchae, as the holder.

The ear model unit 50 may be made from similar material to the material of an average ear model used in, for example, a manikin such as a Head And Torso Simulator (HATS), Knowles Electronic Manikin for Acoustic Research (KEMAR), or the like, such as material conforming to IEC 60318-7 or IEC 60268-7. This material may, for example, be formed with a material such as rubber having a Shore hardness of 30 to 60 (such as a Shore hardness of 35 to 55).

The thickness of the artificial external ear canal unit 52, i.e. the length of the artificial external ear canal 53, preferably corresponds to the length up to the human eardrum (cochlea) and for example is suitably set in a range of 5 mm to 40 mm. In the present embodiment, the length of the artificial external ear canal 53 is approximately 28.5 mm.

The artificial eardrum 57 is formed so as to block the artificial external ear canal 53 at the edge of the artificial external ear canal unit 52, and vibration from the artificial external ear canal 53 is transmitted to the artificial eardrum 57.

The artificial eardrum 57 is a thin membrane made from similar material to the material of an average ear model used in, for example, a manikin such as a HATS, KEMAR, or the like, such as material conforming to IEC 60318-7 or IEC 60268-7. Basically, it suffices for the thickness thereof to be, for example, approximately from 0.05 mm to 2 mm so as to allow for recreation of the responsiveness to vibration of a human eardrum. It also suffices for the area of the region in contact with the space of the artificial external ear canal 53 in the artificial eardrum 57, i.e. the area of the exposed region facing the artificial external ear canal 53, to be near the size of an average human eardrum, for example a circular, elliptical, or rectangular shape of approximately 0.5 $cm^2$ to 2.5 $cm^2$.

The artificial eardrum 57 is not limited to the above-listed materials or thicknesses and may be formed from biomaterial having polymeric aminoglycoside, which is a typical artificial eardrum material extracted from the shell of a red queen crab, or the like as the main component, or biomaterial having a component refined from collagen of calf skin as the main component. Note that instead of attaching an artificial eardrum formed from these biomaterials to the artificial external ear canal unit 52, an artificial eardrum may be formed from material conforming to the above-mentioned IEC 60318-7 or IEC 60268-7, and the thickness and area of the artificial eardrum formed from this material may be adjusted to approximate the physical characteristics of an artificial eardrum formed from the above-mentioned biomaterials. Alternatively, a rubber membrane, which has been used as repair material for a punctured eardrum, or a rubber bulb, paper strip, collodion membrane, egg membrane, or the like, as well as a naturally derived product or an artificial material such as cellophane, polytetrafluoroethylene, a silicone membrane, collagen, a fibrin membrane, or the like, may be used. The artificial eardrum 57 formed from these materials may be fixed to the edge of the artificial external ear canal unit 52, so as to block the artificial external ear canal 53, with adhesive that is selected taking into consideration the material of the artificial external ear canal unit 52 and the artificial eardrum 57. Of course, the ear model unit 50 may be fabricated by being integrally molded, using the same or a different material as the artificial external ear canal unit 52 and the ear model 51.

Figure 3A:
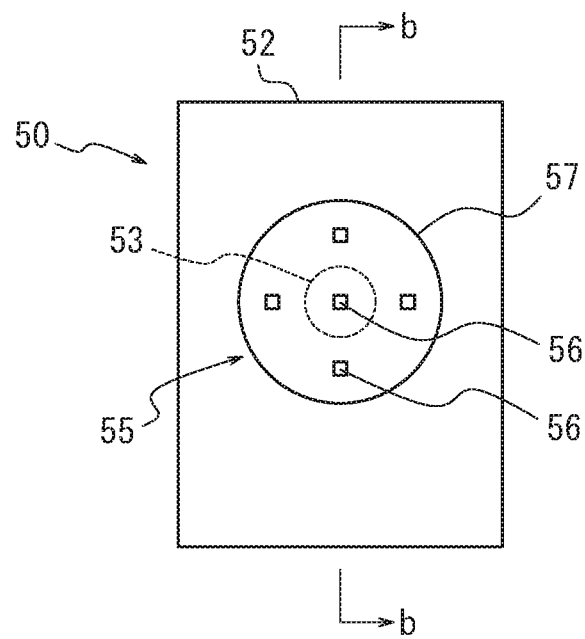
FIGS. 3A and 3B are detailed diagrams of the measurement device in FIG. 1.
Figure 3B:
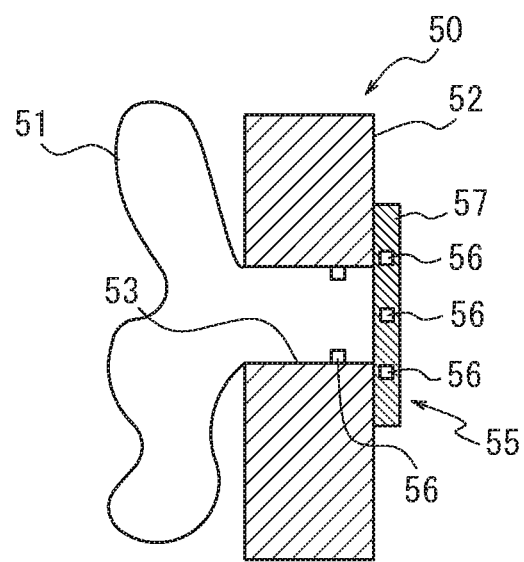

In the ear model unit 50, a vibration detector 55 is disposed on the artificial eardrum 57 at the end face of the artificial external ear canal unit 52 on the opposite side from the ear model 51. The vibration detector 55 may instead be on the ear model side. The vibration detector 55 includes a vibration detection element 56, such as a piezoelectric acceleration pickup. FIG. 3A is a plan view of the ear model unit 50 from the base 10 side, and FIG. 3B is a cross-sectional diagram along the b-b line in FIG. 3A. In FIG. 3A, an example is illustrated of disposing a plurality of vibration detection elements 56, which for example are chip-shaped, in the artificial eardrum 57. Only one vibration detection element 56 may be provided instead. In the case of providing a plurality of vibration detection elements 56, the vibration detection elements 56 may be disposed at appropriate intervals at the periphery of the artificial eardrum 57 and the artificial external ear canal 53, or disposed as an arc surrounding the periphery of the opening in the artificial external ear canal 53. In FIG. 3A, the artificial external ear canal unit 52 is rectangular, yet the artificial external ear canal unit 52 may be any shape. The vibration detection element 56 may, for example, be embedded within the artificial eardrum 57 with only a lead wire being drawn to the outside of the artificial eardrum 57, or the vibration detection element 56 may be attached to the artificial eardrum 57 by adhesive or the like.

The vibration detection element 56 disposed in the artificial eardrum 57 can largely reproduce vibration due to cartilage transmission in the eardrum. For example, information for conversion to sound comparable to when the artificial eardrum 57 is vibrated by air-conducted sound may be obtained. In FIGS. 3A and 3B, the vibration detection elements 56 are disposed near the center of the artificial eardrum 57 and at the periphery of the artificial eardrum 57. The vibration detection element 56 at the central portion can measure the vibration by cartilage transmission in the artificial eardrum 57. When disposed on the side face of the artificial external ear canal 53, the vibration detection element 56 can measure the behavior of vibration directed from the ear to the inner ear at the side face of the external ear canal 53. Furthermore, the vibration detection elements 56 disposed around the artificial eardrum 57, i.e. on the outside of the artificial external ear canal 53 in FIG. 3A, can measure the vibration component that, in terms of the human body, is transmitted from the external ear canal to the inner ear without passing through the eardrum.

The chip-shaped vibration detection element 56 may, for example, be selected from among commercially available elements, such as the ultra-compact and lightweight type NP-2106 by Ono Sokki Co. Ltd., the PV-08A or PV-90B by Rion Co., Ltd, and the like. The weight of the PV-08A by Rion Co., Ltd., for example, is approximately 0.7 g, yet the addition of this weight causes the vibration characteristics of the artificial eardrum to differ from the vibration characteristics of an actual human eardrum. In light of this fact, the weight of the artificial eardrum 57 may be reduced in advance. A vibration detection element 56 of approximately 0.2 g, such as the TYPE 7302 by Aco Co., Ltd., is preferably a lightweight, appropriate vibration detection element.

The vibration detection element 56 in the artificial eardrum 57 simulatingly detects vibration of the eardrum due to the so-called air-conducted component that is emitted from the acoustic device as air-conducted sound and reaches the eardrum, vibration of the eardrum due to a radiation component emitted from within the external ear canal as a result of the inner wall of the artificial external ear canal 52 vibrating due to vibration of the acoustic device, and a component such that vibration itself causes the eardrum to vibrate.

The following describes the holder 70 in which the acoustic device 100, such as an earphone, is held. When the acoustic device 100 is a cartilage transmission earphone, the housing 101 of the earphone is partially or entirely inserted in the hole of the ear. The ear model unit 50 faithfully models the shape of a human ear and is naturally provided with an auricle and external ear canal. Therefore, the earphone may be inserted into the auricle or external ear canal.

Figure 4A:
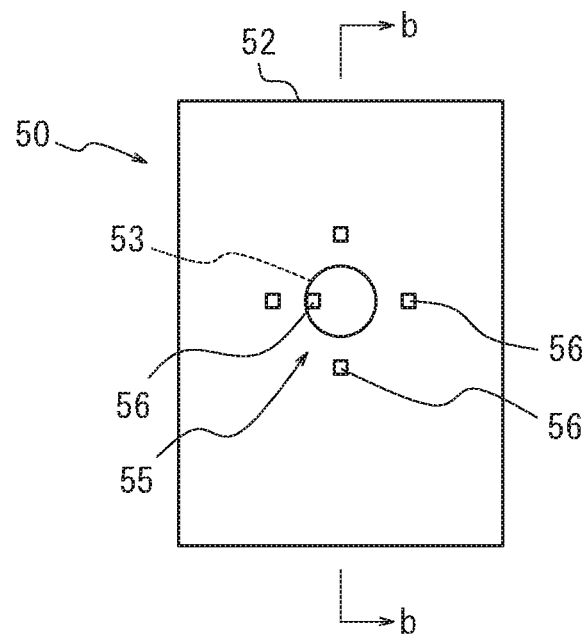
FIGS. 4A and 4B are detailed diagrams of a modification to the measurement device in FIG. 1.
Figure 4B:
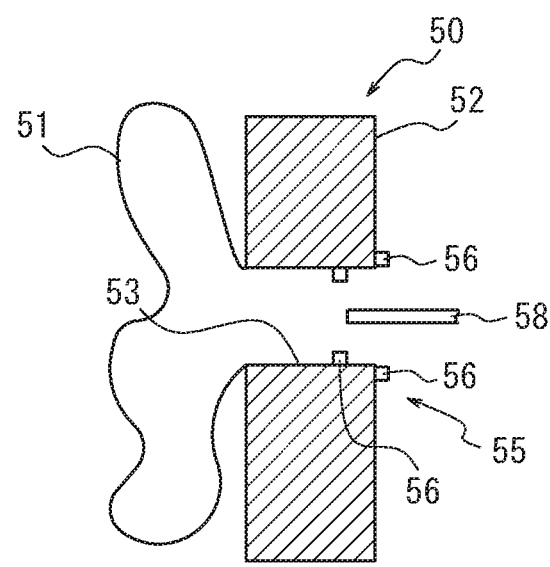

FIGS. 4A and 4B illustrate a modification to the ear model unit 50. This ear model unit 50 does not include the artificial eardrum 57, and the vibration detection elements 56 are provided at the back end of the artificial external ear canal 53, i.e. on the back face of the artificial external ear canal unit 52. In this case, the vibration component transmitted to the inner ear without passing through the eardrum in the human body, such as the component (bone-conducted component) transmitted to the inner ear via the jawbone or the temporal bone, can be measured. In this example as well, a vibration detection element 56 is disposed on the side face of the artificial external ear canal 53. Hence, the behavior of vibration directed from the ear to the inner ear at the side face of the external ear canal 53 can be measured. In order to measure this plurality of components, a plurality of vibration detection elements 56 may be provided, and the total auditory sensation can be detected by totaling the measured values yielded by correcting each output value. The correction width of each output value may be adjusted by calculating a transmission function for conversion to an air-conducted sound-based value, using an existing threshold method or adjustment method.

Figure 5:
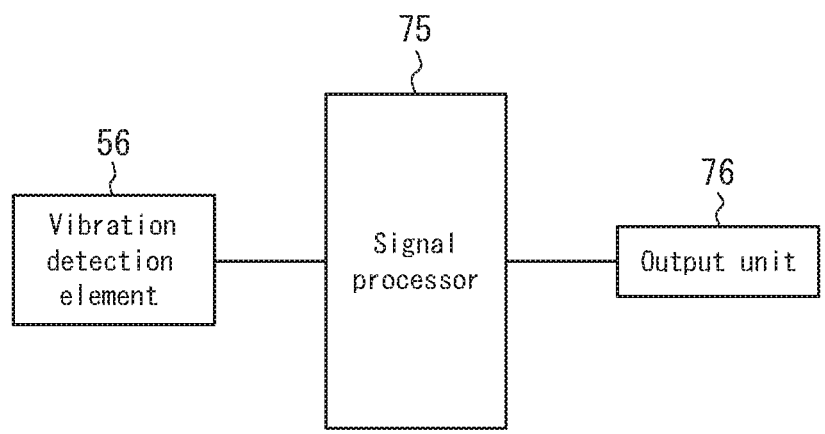
FIG. 5 is a functional block diagram of a section of the measurement device in FIG. 1.

FIG. 5 is a functional block diagram of a section of the measurement device 10 according to the present embodiment. One or a plurality of vibration detection elements 56 is connected to a signal processor 75. Based on the output of each vibration detection element 56, the signal processor 75 measures the amount of vibration in the artificial external ear canal unit 52 or the artificial eardrum 57 due to the acoustic device 100. The signal processor 75 also measures an auditory sensation based on the measured amount of vibration. These measurement results are output to an output unit 76 such as a display, a printer, a storage, or the like and provided for evaluation of the acoustic device 100. Measurement includes analysis of the frequency characteristic of emitted air-conducted sound and vibration sound by processing such as a fast Fourier transform.

In this way, the measurement device 10 according to the present embodiment can measure the vibration level weighted for characteristics of vibration transmission of a human ear, hence allowing for accurate evaluation of the acoustic device 100.

Furthermore, when providing a microphone 58 supported in midair within or at the terminal end of the artificial external ear canal 53, as in the modification in FIGS. 4A and 4B, the air-conducted sound pressure via the artificial external ear canal 53 can also be measured at the same time as the vibration level. This configuration allows for measurement of an auditory sensation level that combines the vibration level, which corresponds to cartilage transmission, and the sound pressure level, which corresponds to the air-conducted sound pressure. Hence, the acoustic device 100 can be evaluated in greater detail. The radiation component within the external ear canal, representing vibration that has turned into an air-conducted component within the artificial external ear canal 53, can thus be measured.

The vibration level corresponding to cartilage transmission correlates with a certain sound pressure level corresponding to air-conducted sound pressure. When initially constructing the measurement device, this correlation may be obtained by running a standard experiment on multiple actual subjects and referring to correlation data between the auditory sensation for vibration sound pressure due only to a vibration sound source and the auditory sensation for air-conducted sound pressure due only to an air-conducted sound source, and correlation data between the auditory sensation for sound pressure due to both a vibration sound source and an air-conducted sound source and the auditory sensation of air-conducted sound pressure due only to an air-conducted sound source.

Embodiment 2

Figure 6:
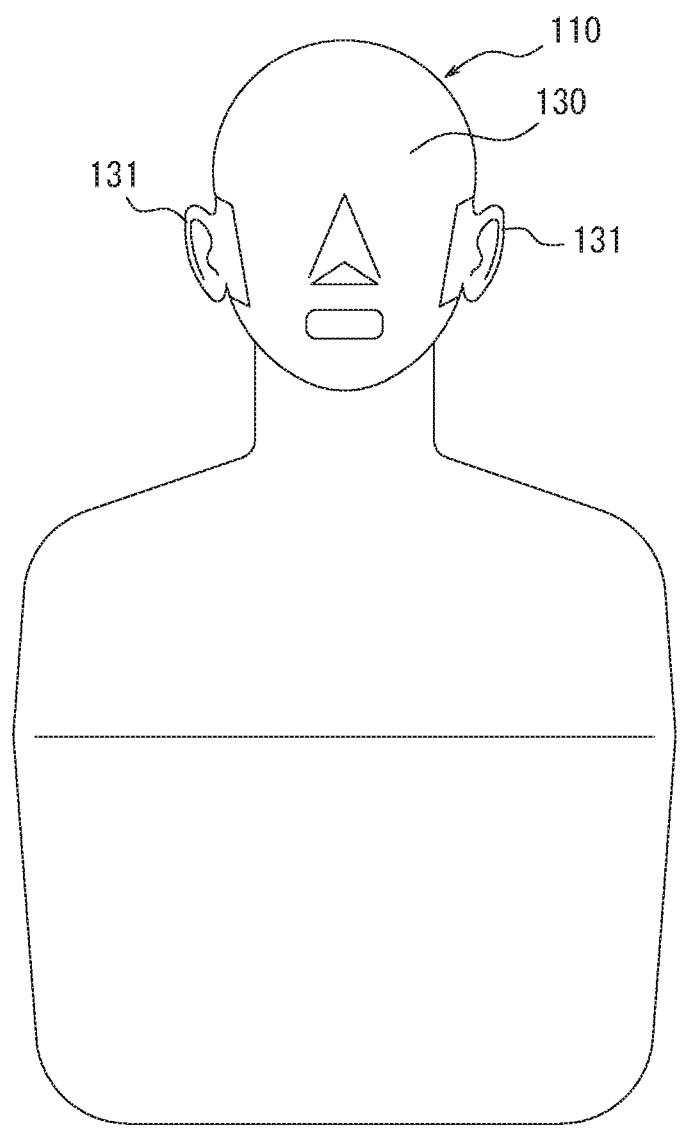
FIG. 6 schematically illustrates the structure of a measurement device according to Embodiment 2.

FIG. 6 schematically illustrates the structure of a measurement device according to Embodiment 2. In a measurement device 110 according to the present embodiment, the model of the human body further includes a human head model 130. The head model 130 is, for example, HATS, KEMAR, or the like. Artificial ears 131 of the head model 130 are detachable from the head model 130.

Figure 7A:
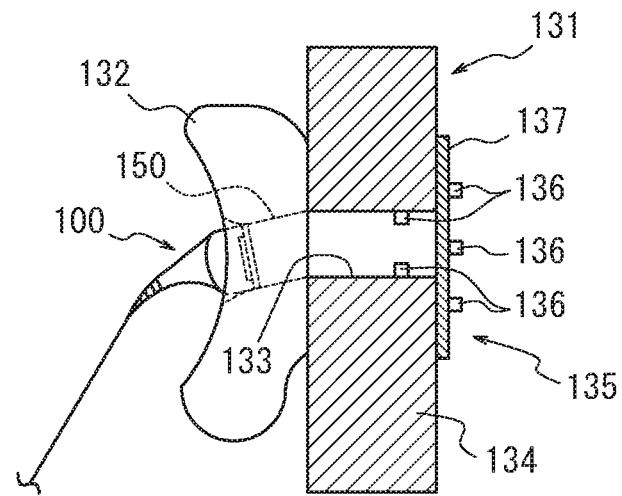
FIGS. 7A and 7B are detailed diagrams of the measurement device in FIG. 6.
Figure 7B:
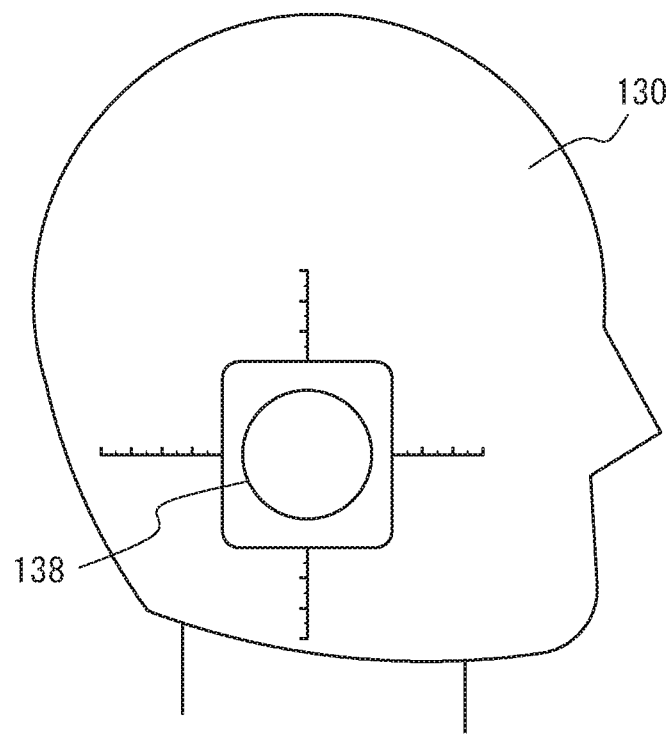

The artificial ear 131 includes, like the ear model unit 50 in Embodiment 1, an ear model 132, an artificial external ear canal unit 134, joined to the ear model 132, in which an artificial external ear canal 133 is formed, and a membranous artificial eardrum 137 at an end of the artificial external ear canal unit 134, as illustrated by the side view in FIG. 7A of the artificial ear 131 removed from the head model 130. Like the ear model unit 50 in Embodiment 1, a vibration detector 135 provided with a vibration detection element 136 is disposed at the periphery of the opening in the artificial external ear canal 133 in the artificial external ear canal unit 134. The artificial ear 131 is detachably mounted on a mounting portion 138 formed on a side face of the head model 130, as illustrated by the side view of the head model 130 in FIG. 7B with the artificial ear 131 removed.

A holder 150 is formed by the auricle or hole of the ear, which communicates with the artificial external ear canal 133 of the artificial external ear canal unit 134, for holding the acoustic device 100 such as an earphone.

The measurement device 110 according to the present embodiment achieves effects similar to those of the measurement device 10 in Embodiment 1. Among other effects, in the present embodiment, the acoustic device 100 is evaluated by detachably mounting the artificial ear 131 for vibration detection on the human head model 130, thus allowing for evaluation that conforms more closely to the actual form of use by accounting for the effect of the head.

The present disclosure is not limited to the above embodiments, and a variety of modifications and changes are possible. For example, in the above embodiments, the acoustic device 100 targeted for measurement is assumed to be an acoustic device, such as an earphone, in which a piezoelectric vibrator 102 vibrates and transmits vibration to the housing 101, so that the ear is vibrated via the housing. By modifying the holder that holds the acoustic device, however, it would be easy to similarly evaluate a device used by covering the entire ear, such as a headphone held by a human head, a device that transmits vibration to the ear via an acoustic device provided in a head-mounted display, or a device in which a vibrating element is embedded in the earpiece of a pair of eyeglasses and vibration of the earpiece transmits vibration sound.

Figure 8A:
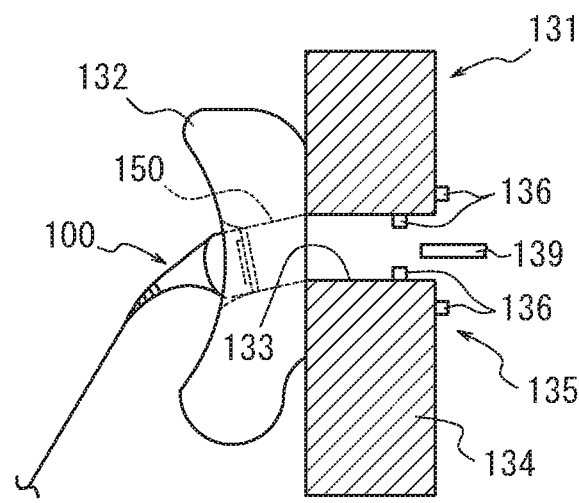
FIGS. 8A and 8B are detailed diagrams of a modification to the measurement device in FIG. 6.
Figure 8B:
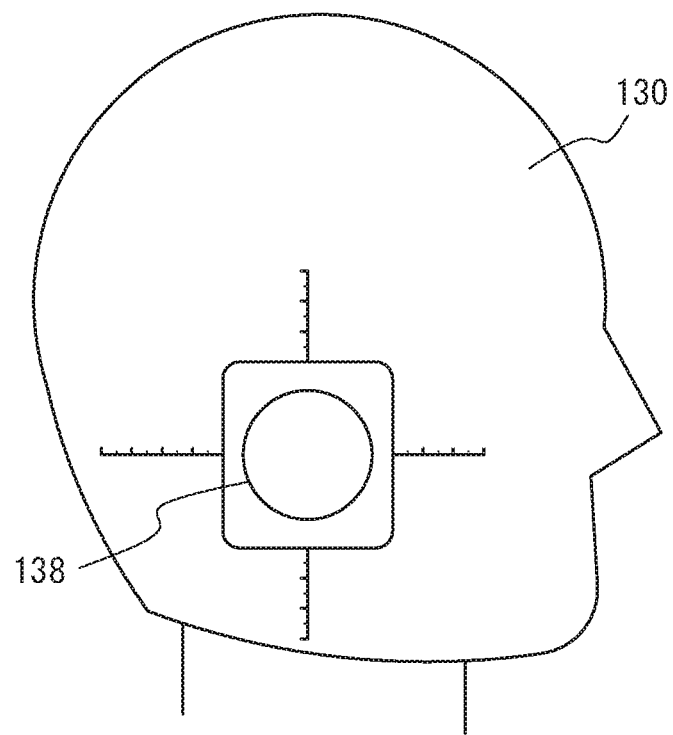

FIGS. 8A and 8B illustrate a modification to the measurement device in FIG. 6. The measurement device in FIGS. 8A and 8B does not include the artificial eardrum 137 in the artificial ear 131, and the vibration detection elements 136 are provided at the back end of the artificial external ear canal 133. In this case, the vibration component transmitted to the inner ear without passing through the eardrum in the human body can be measured. In this example as well, a vibration detection element 136 is disposed on the side face of the artificial external ear canal 133. Hence, the behavior of vibration directed from the ear to the inner ear at the side face of the external ear canal 133 can be measured.

When providing a microphone 139 supported in midair within the artificial external ear canal unit 133, as in the modification in FIGS. 8A and 8B, the air-conducted sound pressure in the artificial external ear canal 133 can also be measured at the same time as the vibration level. This configuration allows for measurement of an auditory sensation level that combines the vibration level, which corresponds to cartilage transmission, and the sound pressure level, which corresponds to the air-conducted sound pressure. Hence, the acoustic device 100 can be evaluated in greater detail.

The vibration level corresponding to cartilage transmission correlates with a certain sound pressure level corresponding to air-conducted sound pressure. When initially constructing the measurement device, this correlation may be obtained by running a standard experiment on multiple actual subjects and referring to correlation data between the auditory sensation for vibration sound pressure due only to a vibration sound source and the auditory sensation for air-conducted sound pressure due only to an air-conducted sound source, and correlation data between the auditory sensation for sound pressure due to both a vibration sound source and an air-conducted sound source and the auditory sensation of air-conducted sound pressure due only to an air-conducted sound source.

Embodiment 3

Next, an example of a measurement method using the measurement device is described.

For example, each measurement may be made by the following measurement steps. (1) Attach the acoustic device 100 that vibrates to the measurement device in a predetermined position. (2) Drive the acoustic device with a predetermined power. (3) Obtain detection results of the vibration detector in the measurement device.

Basically, these steps suffice, yet for example a comparison with measurement results of air-conducted sound pressure obtained in the following way is also effective. The following steps are further performed either before or after the above steps. (1) Attach the acoustic device that vibrates to the measurement device in a predetermined position. (2) Drive the acoustic device with a predetermined power. (3) Measure the regular air-conducted sound volume using a measurement device to which is attached a microphone positioned in midair within the external ear canal of the ear model unit in a standard manikin such as HATS, KEMAR, or the like not provided with an eardrum. (4) Then calculate the correspondence between the measurement results for the amount of vibration of the artificial eardrum obtained with the measurement device and the measurement results for the air-conducted sound volume. In this way, the so-called correlation with air-conducted sound volume in the artificial eardrum, i.e. the transmission function, can easily be obtained. In this case, when using the same acoustic device, the air-conducted sound volume and amount of vibration are measured for the same applied power. In other words, the correlation therebetween is obtained for the same acoustic device.

By contrast, the following measurement using a different acoustic device is also effective. Using a speaker with an output of 150 dB in terms of air-conducted sound volume, the amount of vibration when driving the speaker by applying the same power is detected with the measurement device. In this way, the amount of vibration of the artificial eardrum when listening to a 150 dB sound can be measured.

Next, using an acoustic device that transmits audio with only vibration sound or with both vibration sound and air-conducted sound, the same amount of vibration corresponding to 150 dB of the above-described air-conducted sound volume is detected. In this way, the amount of vibration corresponding to the air-conducted sound volume of a typical speaker can be measured. In an acoustic device that can output both sound by vibration transmission and air-conducted sound, the combination of sound by vibration transmission and air-conducted sound is measured as the above amount of vibration corresponding to 150 dB. In an acoustic device only performing vibration transmission, the amount of vibration corresponding to a generally-defined air-conducted sound volume of 150 dB can be measured.

This comparative measurement method may be used to contribute to the production of acoustic devices for which safety is taken into consideration. For example, the amount of vibration of the artificial eardrum corresponding to a large volume of air-conducted sound that might rupture the eardrum may be identified to a certain degree, and based on the findings, the upper limit on the amount of vibration may be restricted. Since the correlation between the air-conducted sound volume and the amount of vibration in the artificial eardrum can be ascertained, it is also easy to design, for example, a portable acoustic device for the severely hearing impaired. In other words, data that are ascertained in advance in a hospital or the like and that relate to how well the severely hearing impaired can hear in terms of air-conducted sound may easily be used directly to set the lower limit or upper limit on the corresponding amount of vibration.

REFERENCE SIGNS LIST

10: Measurement device
30: Base
50: Ear model unit
51: Ear model
52: Artificial external ear canal unit
53: Artificial external ear canal
54: Support member
55: Vibration detector
56: Vibration detection element
57: Artificial eardrum
58: Microphone
70: Holder
100: Acoustic device
101: Body
102: Vibrating element
110: Measurement device
130: Head model
131: Artificial ear
132: Ear model
133: Artificial external ear canal
134: Artificial external ear canal unit
135: Vibration detector
137: Artificial eardrum
138: Mounting portion
139: Microphone
150: Holder

The invention claimed is:

1. A measurement device for evaluating an acoustic device that allows a sound to be transmitted via vibration transmission by being held by a human ear, the measurement device comprising:
   an ear model unit having an ear model modeled after a human ear and an artificial external ear canal unit continuous with the ear model, the ear model unit being formed from rubber, a same material as an auricle model conforming to IEC 60318-7, a same material as an auricle model conforming to IEC 60268-7, or a material having a Shore hardness of from 30 to 60, wherein the ear model is provided with an auricle or a hole which holds the acoustic device;
   a microphone configured to receive an air-conducted component generated within an artificial external ear canal of the artificial external ear canal unit by vibration transmitted to the ear model unit from the acoustic device held by the auricle or the hole;
   a processor configured to measure the air-conducted component received by the microphone; and
   a vibration detector, disposed in a vicinity of the artificial external ear canal unit on an opposite side from the ear model of the ear model unit, and configured to detect magnitude of vibration transmitted through a solid body of the artificial external ear canal unit by detecting acceleration generated by the vibration of the solid body.

2. The measurement device of claim 1, wherein the artificial external ear canal has a length of 5 mm to 40 mm.

3. The measurement device of claim 1, further comprising a human head model, wherein the ear model unit is attachable to and detachable from the human head model as an artificial ear which constitutes a part of the human head model.

4. The measurement device of claim 1, wherein the ear model unit and the artificial external ear canal unit are integrally formed from a same material.

5. The measurement device of claim 1, wherein the ear model is adhered or welded to the artificial external ear canal unit.

6. The measurement device of claim 1, wherein the processor further measures, in addition to the air-conducted component, an air-conduction sound generated by the acoustic device.

7. A measurement method for evaluating an acoustic device that allows a sound to be transmitted via vibration transmission by being held by a human ear, the measurement method comprising:
   providing an ear model unit having an ear model modeled after a human ear and an artificial external ear canal unit continuous with the ear model, the ear model unit being formed from rubber, a same material as an auricle model conforming to IEC 60318-7, a same material as an auricle model conforming to IEC 60268-7, or a material having a Shore hardness of from 30 to 60, wherein the ear model is provided with an auricle or a hole which holds the acoustic device;

detecting by a microphone an air-conducted component generated within the artificial external ear canal of the artificial external ear canal unit by vibration transmitted to the ear model unit from the acoustic device held by the auricle or the hole;

measuring, by a processor, the air-conducted component received by the microphone; and detecting by a vibration detector, disposed in a vicinity of the artificial external ear canal unit on an opposite side from the ear model of the ear model unit, magnitude of vibration transmitted through a solid body of the artificial external ear canal unit by detecting acceleration generated by the vibration of the solid body.

8. The measurement method of claim 7, wherein the artificial external ear canal has a length of 5 mm to 40 mm.

9. The measurement method of claim 7, wherein the ear model unit is attachable to and detachable from a human head model as an artificial ear which constitutes a part of the human head model.

10. The measurement method of claim 7, wherein the ear model unit and the artificial external ear canal unit are integrally formed from a same material.

11. The measurement device of claim 7, wherein the ear model is adhered or welded to the artificial external ear canal unit.

12. The measurement method of claim 7, further comprising measuring by the processor, in addition to the air-conducted component, an air-conduction sound generated by the acoustic device.

* * * * *